United States Patent
Andrasko et al.

(10) Patent No.: US 7,913,549 B2
(45) Date of Patent: Mar. 29, 2011

(54) TRANSITION FROM EXHAUST BRAKING TO EXHAUST PARTICULATE FILTER REGENERATION IN A DIESEL ENGINE

(75) Inventors: Steven J. Andrasko, Wixom, MI (US); Yun Xiao, Ann Arbor, MI (US)

(73) Assignee: GM Global Technology Operations LLC

( * ) Notice: Subject to any disclaimer, the term of this patent is extended or adjusted under 35 U.S.C. 154(b) by 218 days.

(21) Appl. No.: 12/260,459

(22) Filed: Oct. 29, 2008

(65) Prior Publication Data

US 2009/0314070 A1    Dec. 24, 2009

Related U.S. Application Data

(60) Provisional application No. 61/074,388, filed on Jun. 20, 2008.

(51) Int. Cl.
*G01M 15/04* (2006.01)

(52) U.S. Cl. .................................... 73/114.36

(58) Field of Classification Search ............. 73/114.36
See application file for complete search history.

(56) References Cited

U.S. PATENT DOCUMENTS

| | | | |
|---|---|---|---|
| 5,113,652 A * | 5/1992 | Baines et al. ............. | 60/288 |
| 6,708,104 B2 * | 3/2004 | Avery et al. .............. | 701/110 |
| 6,837,043 B2 * | 1/2005 | Nakatani et al. .......... | 60/288 |
| 6,883,318 B2 * | 4/2005 | Warner et al. ............ | 60/602 |
| 6,988,361 B2 * | 1/2006 | van Nieuwstadt et al. ... | 60/295 |
| 7,263,824 B2 * | 9/2007 | Bellinger et al. ......... | 60/288 |
| 7,275,795 B2 * | 10/2007 | Nishina et al. ........... | 303/186 |
| 7,302,335 B1 * | 11/2007 | Xiao ..................... | 701/103 |
| 7,331,172 B2 * | 2/2008 | Persson .................. | 60/295 |
| 7,437,874 B2 * | 10/2008 | Ramamurthy et al. ....... | 60/602 |
| 7,680,586 B2 * | 3/2010 | Ruth et al. .............. | 701/109 |
| 2004/0016232 A1 * | 1/2004 | Warner et al. ............ | 60/602 |
| 2008/0196395 A1 * | 8/2008 | Hashizume ............... | 60/295 |
| 2009/0019836 A1 * | 1/2009 | Nagaoka et al. .......... | 60/285 |
| 2009/0031715 A1 * | 2/2009 | Fluga et al. ............. | 60/311 |
| 2009/0193790 A1 * | 8/2009 | Richter et al. ........... | 60/274 |
| 2009/0288413 A1 * | 11/2009 | Xiao et al. .............. | 60/602 |

\* cited by examiner

*Primary Examiner* — Lisa M Caputo
*Assistant Examiner* — Freddie Kirkland, III

(57) ABSTRACT

An intake throttle valve (ITV) position determination module generates a desired ITV position based on at least one of a desired airflow in a regeneration mode and an exhaust braking request in an exhaust braking mode. An ITV position limitation module generates a limited ITV position based on the desired ITV position. A transition module detects a transition from the exhaust braking mode to the regeneration mode, wherein an ITV is controlled to the limited ITV position after the transition is detected.

20 Claims, 4 Drawing Sheets

TRANSITION FROM EXHAUST BRAKING TO EXHAUST PARTICULATE FILTER REGENERATION IN A DIESEL ENGINE

CROSS-REFERENCE TO RELATED APPLICATIONS

This application claims the benefit of U.S. Provisional Application No. 61/074,388, filed on Jun. 20, 2008. The disclosure of the above application is incorporated herein by reference in its entirety.

FIELD OF THE INVENTION

The present disclosure relates to internal combustion engines, and more particularly to an engine control system for transitioning between engine operating modes.

BACKGROUND OF THE INVENTION

Referring now to FIG. 1, a functional block diagram of an engine system is presented. Air enters through an air filter 102, which may include a mass airflow meter or other sensors (not shown). The air continues through the intake inlet side of a turbocharger 104 where the air may be compressed. Upon exiting, the air may pass through an air cooler 106 or other conditioners before it enters an intake manifold 108. As the air enters the intake manifold 108, exhaust gases may be recirculated via an exhaust gas recirculation (EGR) valve 110 to create an air mixture. The EGR valve 110 may be positioned by an EGR positioning module 112.

Once the air mixture reaches the intake manifold 108, it may be combined with fuel from a fuel injector 114 in a cylinder 116 to produce positive torque. The engine system may include multiple fuel injectors 114 and cylinders 116. Exhaust gases exit the cylinder 116 through an exhaust manifold 118 and enter an exhaust inlet side of the turbocharger 104. The turbocharger 104 may be used to increase mass airflow and/or intake manifold pressure. Increased mass airflow and intake manifold pressure may allow for increased drive torque. Exhaust gases may flow through a catalyst 120 or other exhaust treatment components. A particulate filter 122 collects particulate matter from the exhaust gases before the gases are released to the atmosphere.

An engine control module 124 controls operation of the engine system in various operating modes. The operating mode may be determined by various factors including driver input and other vehicle demands.

For example, it may be necessary to remove the particulates from the particulate filter 122 by oxidizing the particulates. The engine system may achieve oxidization of the particulates at elevated exhaust gas temperatures. Exhaust gas temperatures may be increased by controlling the air/fuel mixture in the engine system by altering the output of the fuel injector 114.

The engine system may also provide engine braking, which uses pumping losses and/or frictional losses to slow the vehicle. Fuel injector 114 may be cut off so that only air flows through the engine system. Air pressure inside the cylinders 116 may slow the engine and therefore the vehicle.

SUMMARY

An engine control system comprises an intake throttle valve (ITV) position determination module, an ITV position limitation module, and a transition module. The ITV position determination module generates a desired ITV position based on at least one of a desired airflow and an exhaust braking request, where the desired airflow is set to a regeneration mode airflow in a regeneration mode. The ITV position determination module sets the desired ITV position to an ITV braking position in an exhaust braking mode. The ITV position limitation module generates a limited ITV position based on the desired ITV position. The transition module detects a transition from the exhaust braking mode to the regeneration mode. An ITV is controlled to the limited ITV position after the transition is detected.

In other features, after the limited ITV position equals the desired ITV position, the ITV is controlled to the desired ITV position. The limited ITV position is based on a signal from at least one of an engine speed (RPM) sensor and a manifold air pressure (MAP) sensor. The limited ITV position is between the desired ITV position in regeneration mode and the ITV braking position. The engine control system further comprises an ITV rate limitation module that generates a limited ITV rate. The ITV is controlled at the limited ITV rate after the transition is detected.

The engine control system further comprises a selection module that selects the limited ITV position after the transition is detected. The engine control system further comprises a desired airflow determination module that sets the desired airflow to the regeneration mode airflow in the regeneration mode. The engine control system further comprises an exhaust braking module that generates the exhaust braking request. The engine control system further comprises a variable nozzle turbocharger (VNT) position determination module. The VNT position determination module controls a VNT to a VNT braking position in the exhaust braking mode. The engine control system further comprises an exhaust gas recirculation (EGR) module. The EGR module controls an EGR valve to a closed position in the exhaust braking mode.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
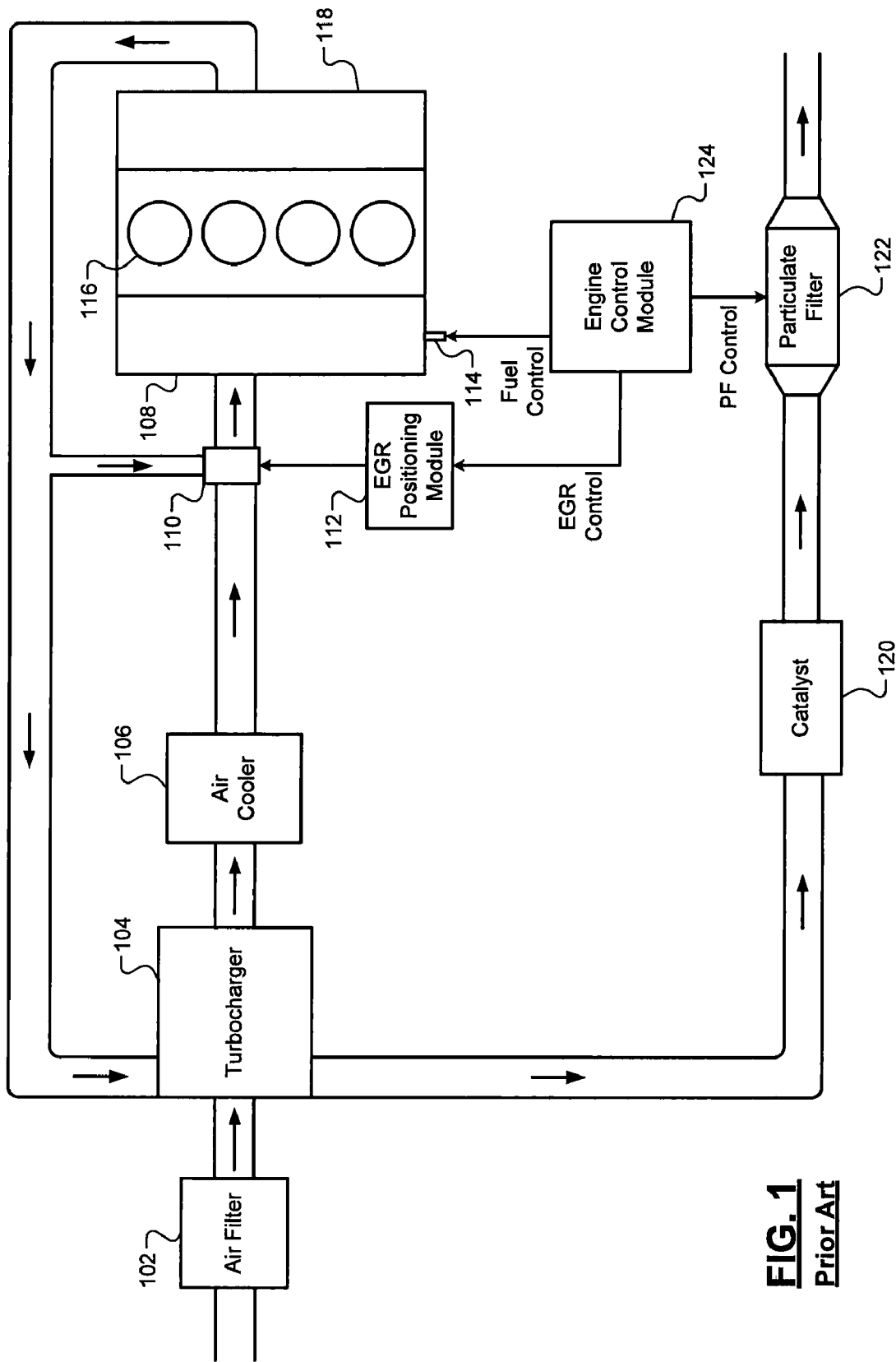
FIG. 1 is a functional block diagram of a vehicle according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Normally, a diesel engine system combusts diesel fuel with air flowing through an intake manifold producing positive torque which propels the vehicle. Exhaust gases flow out of the engine through an exhaust manifold. Various exhaust treatment components treat the exhaust gases before they escape to the atmosphere.

In an exhaust braking mode, the engine system produces negative torque by increasing exhaust backpressure. The increased exhaust backpressure opposes movement of the pistons during the exhaust stroke, which applies braking forces through the driveline to slow the entire vehicle. The engine control module may stop fueling the cylinders to prevent any positive torque from being produced by combustion.

In a particulate filter regeneration mode, the engine system combusts diesel particulate emissions from a particulate filter by a process of regeneration. During regeneration, the particulates are oxidized at an elevated temperature. The air/fuel mixture is controlled to achieve the elevated temperature necessary for oxidation.

When transitioning from exhaust braking mode to regeneration mode, the engine system releases exhaust backpressure. This causes a rush of air through the engine system and possible overreaction by various sensors and actuators. This may also result in audible air system noise, possible damage to the turbocharger, an engine speed dip, or even engine stalls due to the increased exhaust flow and decreased intake airflow. A high fueling spike may result from engine control fuel compensation or driver input attempting to compensate for the lower engine speed. Furthermore, a driver may feel a "bump" or vehicle surge due to the transition.

The present disclosure prevents the engine system from overreacting by controlling the airflow through the engine during transitioning. Once the engine system detects the transition, changes in airflow are limited for a predetermined period of time.

Figure 2:
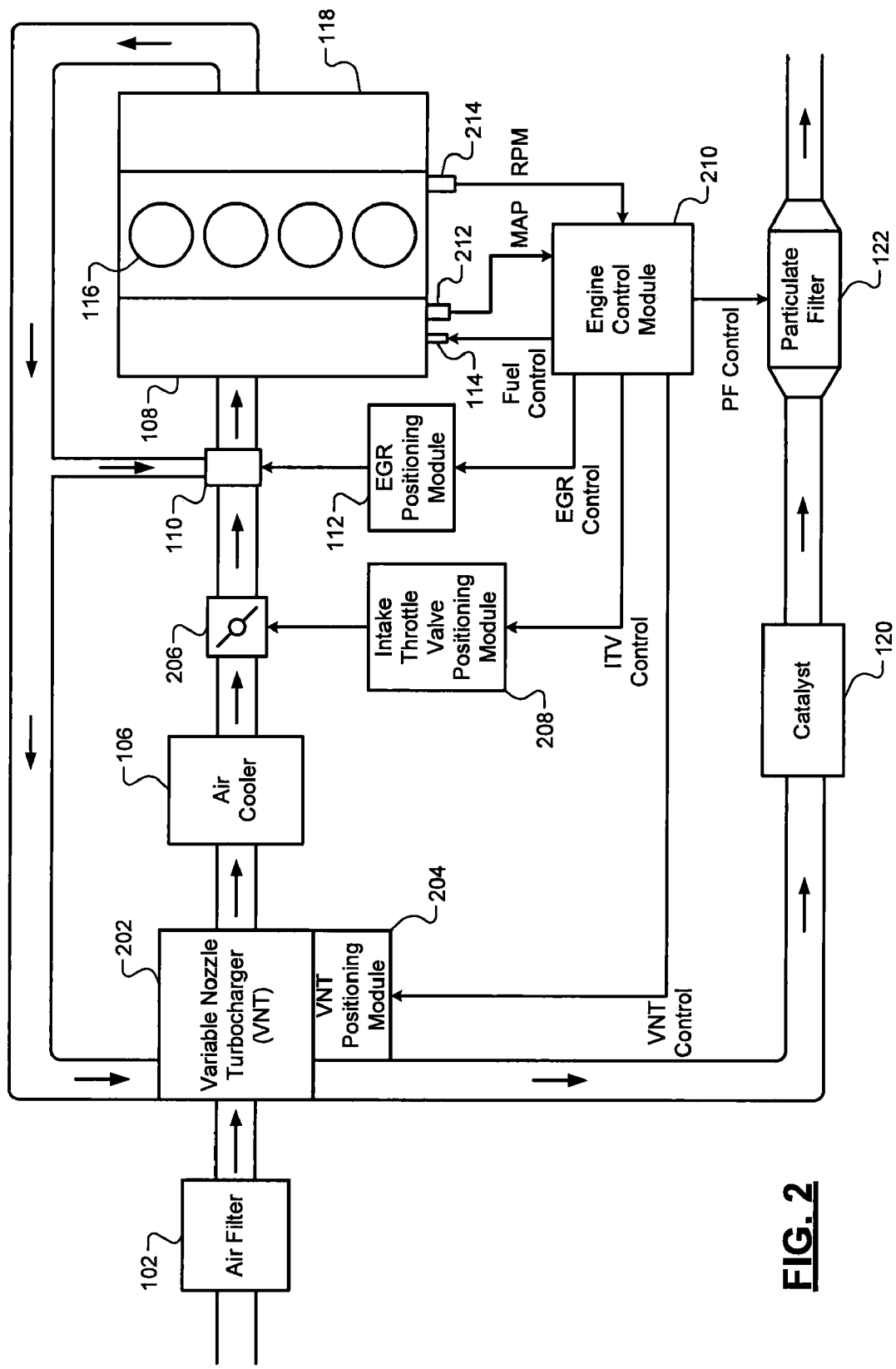
FIG. 2 is a functional block diagram of an exemplary vehicle according to the principles of the present disclosure.

Referring now to FIG. 2, a functional block diagram of an exemplary engine system is presented. Air enters through the air filter 102, which may include a mass airflow meter or other sensors (not shown). The air continues through the intake inlet side of a variable nozzle turbocharger (VNT) 202. The VNT 202 compresses the air and is controlled by a VNT positioning module 204. Upon exiting, the compressed air may pass through the air cooler 106 or other conditioners before it passes through an intake throttle valve (ITV) 206. The ITV 206 may be positioned at various angles to the airflow by an ITV positioning module 208. As the air enters the intake manifold 108, exhaust gases may be recirculated via the EGR valve 110 to create an air mixture. The EGR valve 110 may be positioned by the EGR positioning module 112.

Normally, the air mixture from the intake manifold 108 is combined with fuel from the fuel injector 114 in the cylinder 116 to produce positive torque. The engine system may include multiple fuel injectors 114 and cylinders 116. The exhaust gases exit the cylinder 116 through the exhaust manifold 118 and enter an exhaust inlet side of the VNT 202. The VNT 202 may restrict the flow and/or increase the velocity of the exhaust gases based on control by the VNT positioning module 204. Exhaust gases may flow through the catalyst 120 or other exhaust treatment components. The particulate filter 122 collects particulate matter from the exhaust gases before the gases are released to the atmosphere.

An engine control module 210 controls the engine system in various operating modes. The operating mode may be determined by various factors including driver input and other vehicle demands. Feedback from various sensors and modules may be used by the engine control module 210. Therefore, while unidirectional arrows are shown, such as from the engine control module 210 to the intake throttle valve (ITV) positioning module 208 and the EGR positioning module 112, signals may also be received by the engine control module 210. For example, the engine control module 210 may receive status and fault information.

In exhaust braking mode, the engine system produces negative torque by increasing exhaust. Based on an exhaust braking request, the fuel injector 114 may stop fueling the cylinder 116. The VNT positioning module 204 closes the VNT 202 to a VNT braking position to increase exhaust backpressure. The increased backpressure opposes movement of the pistons during the exhaust stroke, which applies braking forces through the driveline to slow the entire vehicle. The ITV positioning module 208 opens the ITV 206 to an ITV braking position to allow greater intake airflow. The increased velocity of the exhaust gas flow through the VNT 202 increases intake manifold pressure and forces more air into the cylinders further increasing backpressure.

In a regeneration mode, the engine control module 210 controls airflow and fuel entering the engine system to oxidize particulates in the particulate filter 122. Based on a regeneration request, the ITV positioning module 208 moves the ITV 206 to a position corresponding to a regeneration mode airflow for proper oxidation of particulates in the particulate filter 122. The VNT positioning module 204 positions the VNT 202 to allow the exhaust gases to freely flow to the catalyst 120 and other exhaust components including the particulate filter 122. Regeneration may be initiated by increasing fuel delivery, causing unburned fuel to reach the particulate filter 122.

After a transition from exhaust braking mode to regeneration mode is detected, the engine control module 210 controls the ITV positioning module 208 to limit movement of the ITV 206. The engine system includes a manifold air pressure (MAP) sensor 212 and an engine speed (RPM) sensor 214. The engine control module 210 receives signals from the MAP sensor 212 and the RPM sensor 214. The engine control module 210 may receive signals from other components (not shown), such as a mass airflow sensor and various temperature sensors. The engine control module 210 uses the received signals to determine limitations on the movement of the ITV 206.

Figure 3:
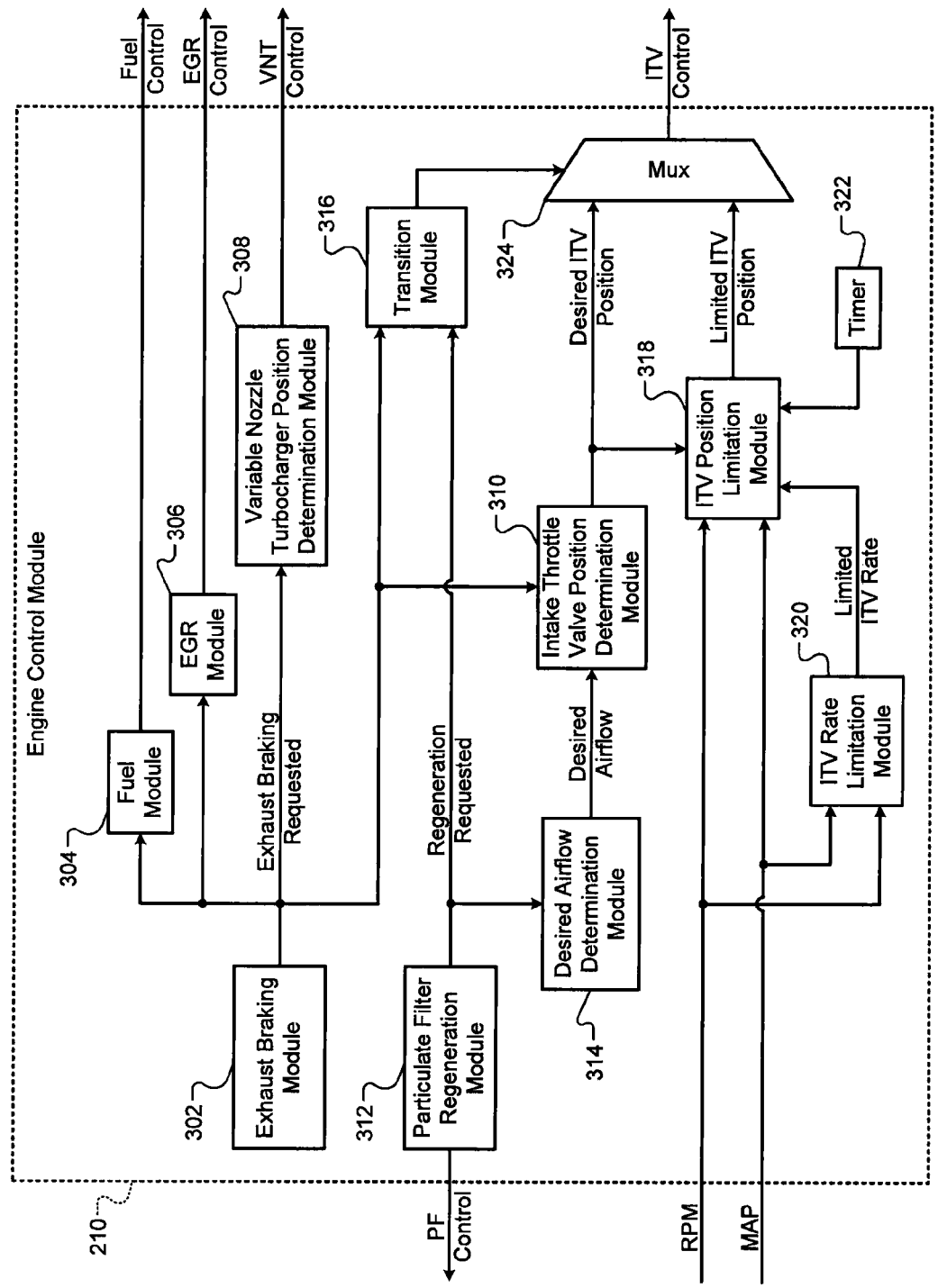
FIG. 3 is a functional block diagram of an exemplary implementation of the engine control module according to the principles of the present disclosure.

Referring now to FIG. 3, a functional block diagram of an exemplary implementation of the engine control module 210 is presented. An exhaust braking module 302 requests exhaust braking mode. In exhaust braking mode, a fuel module 304 may instruct the fuel injector 114 to stop providing fuel. An EGR module 306 closes the EGR valve 110 to prevent exhaust gas recirculation into the intake manifold 108, which would decrease backpressure.

In addition, during exhaust braking mode, a VNT position determination module 308 generates a VNT braking position that increases exhaust backpressure. The VNT positioning module 204 controls the VNT 202 to this VNT braking position. The VNT braking position causes vanes of the VNT 202 to be substantially closed to maximize exhaust backpressure. Closing the vanes harnesses more power of the exhaust gas and therefore causes the VNT 202 to produce more intake pressure boost. An ITV position determination module 310 sets the desired ITV position to an ITV braking position to increase intake pressure and airflow. The ITV braking position is substantially open to maximize intake manifold air pressure and airflow, which creates backpressure once exhausted from the engine.

A particulate filter regeneration module 312 may subsequently request regeneration mode. In regeneration mode, a desired airflow determination module 314 sets the desired intake airflow to a regeneration mode airflow. The ITV position determination module 310 generates the desired ITV position based on the desired airflow, and therefore sets the desired ITV position to a position determined by the regeneration mode airflow. This may be referred to as a regeneration ITV position.

A transition module 316 detects when there is a transition from the exhaust braking mode to the regeneration mode. The transition may be detected based on the exhaust braking request and the regeneration request.

An ITV position limitation module 318 calculates a limited ITV position based on the desired ITV position. Signals from the MAP sensor 212 and the RPM sensor 214 may be used to calculate the limited ITV position. Other signals may also be used to calculate the limited ITV position including mass air flow, engine load, temperatures, and others.

An ITV rate limitation module 320 calculates a limited ITV rate based on signals from the MAP sensor 212 and the RPM sensor 214. Other signals may also be used to calculate the limited ITV rate including mass air flow, engine load, temperatures, and others. The limited ITV rate may limit the rate of change of the ITV position after the transition is detected.

A timer 322 determines a hold time after the transition is detected during which the position of the ITV 206 will not exceed the limited ITV position. The hold time may be a calibratable period of time or based on similar signals as those used by the ITV position limitation module 318. A selection module 324 limits the control of the ITV 206 to the limited ITV position during the transition. Control of the ITV 206 may resume based on the desired ITV position once the limited ITV position reaches the desired ITV position.

Figure 4:
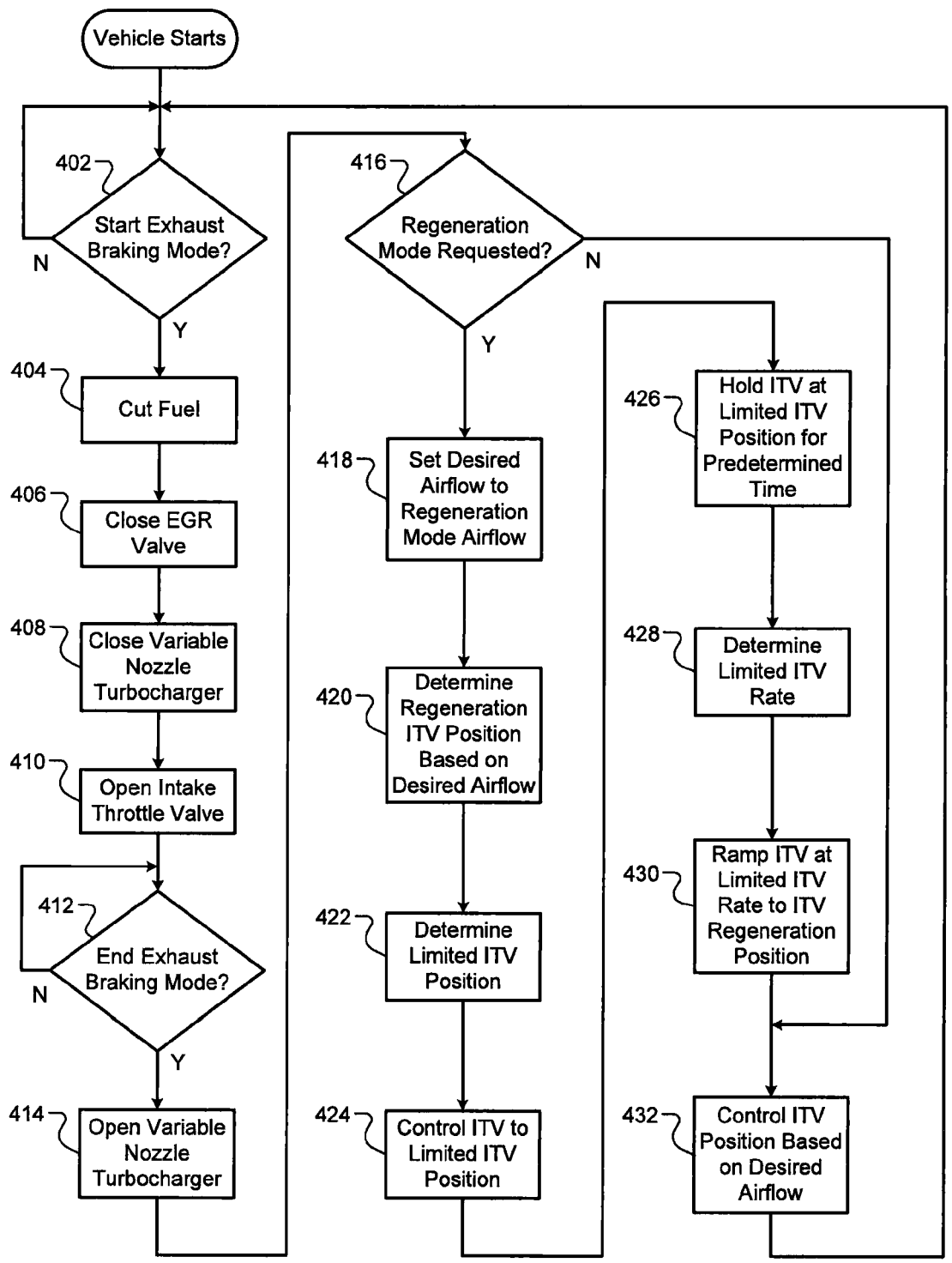
FIG. 4 is a flowchart depicting exemplary steps performed by a control system according to the principles of the present disclosure.

Referring now to FIG. 4, a flowchart depicts exemplary steps of an engine control system. In step 402, control determines if the exhaust braking mode is requested. Control remains in step 402 until exhaust braking is requested, at which time control transfers to step 404. In step 404, control stops fueling the engine. Control continues in step 406, where the EGR valve 110 is closed to prevent a decrease in exhaust backpressure. Control continues in step 408, where the VNT 202 is closed to the VNT braking position to increase exhaust backpressure. Control continues in step 410, where the ITV 206 is opened to the ITV braking position to increase intake manifold pressure and airflow.

Control continues in step 412, where control determines if the exhaust braking mode is no longer requested. Once the request for exhaust braking mode ends, control transfers to step 414. In step 414, control opens the VNT 202 to control boost. Exhaust backpressure decreases and intake airflow increases as pressure in the intake manifold 108 is released.

In step 416, control determines if regeneration mode is requested. If regeneration is requested, control transfers to step 418; otherwise, control transfers to step 432. In step 418, control sets the desired airflow to the regeneration mode airflow. Control continues in step 420, where control determines the desired ITV position based on the desired airflow. Here, the desired airflow is the regeneration mode airflow, and the desired ITV position is therefore called the regeneration ITV position.

Control continues in step 422, where control determines the limited ITV position during the transition from exhaust braking mode to regeneration mode. For example only, the limited ITV position may be a predetermined percentage toward the regeneration ITV position from the current ITV position. Alternatively, and for example only, the limited ITV position may be closed from the regeneration ITV position by a predetermined amount.

Control continues in step 424, where the ITV 206 is controlled to the limited ITV position. Control continues in step 426, where the ITV 206 is held to the limited ITV position for a predetermined period of time. Control continues in step 428, where control determines a limited ITV rate. Control continues in step 430, where the ITV 206 is controlled at the limited ITV rate to the regeneration ITV position. Control continues in step 432, where control of the ITV position based on the desired airflow resumes. Control then returns to step 402.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system comprising:
an intake throttle valve (ITV) position determination module that generates a desired ITV position based on at least one of a desired airflow and an exhaust braking request, wherein the desired airflow is set to a regeneration mode airflow in a regeneration mode, and wherein the ITV position determination module sets the desired ITV position to an ITV braking position in an exhaust braking mode;
an ITV position limitation module that generates a limited ITV position based on the desired ITV position; and
a transition module that detects a transition from the exhaust braking mode to the regeneration mode, wherein an ITV is controlled to the limited ITV position after the transition is detected.

2. The engine control system of claim 1, wherein after the limited ITV position equals the desired ITV position, the ITV is controlled to the desired ITV position.

3. The engine control system of claim 1, wherein the limited ITV position is based on a signal from at least one of an engine speed (RPM) sensor and a manifold air pressure (MAP) sensor.

4. The engine control system of claim 1, wherein the limited ITV position is between the desired ITV position in regeneration mode and the ITV braking position.

5. The engine control system of claim 1, further comprising an ITV rate limitation module that generates a limited ITV rate, wherein the ITV is controlled at the limited ITV rate after the transition is detected.

6. The engine control system of claim 1, further comprising a selection module that selects the limited ITV position after the transition is detected.

7. The engine control system of claim 1, further comprising a desired airflow determination module that sets the desired airflow to the regeneration mode airflow in the regeneration mode.

8. The engine control system of claim 1, further comprising an exhaust braking module that generates the exhaust braking request.

9. The engine control system of claim 1, further comprising a variable nozzle turbocharger (VNT) position determination module, wherein the VNT position determination module controls a VNT to a VNT braking position in the exhaust braking mode.

10. The engine control system of claim 1, further comprising an exhaust gas recirculation (EGR) module, wherein the EGR module controls an EGR valve to a closed position in the exhaust braking mode.

11. A method comprising:
generating a desired intake throttle valve (ITV) position based on at least one of a desired airflow and an exhaust braking request, wherein the desired airflow is set to a regeneration mode airflow in a regeneration mode, and wherein the ITV position determination module sets the desired ITV position to an ITV braking position in an exhaust braking mode;
generating a limited ITV position based on the desired ITV position; and
detecting a transition from the exhaust braking mode to the regeneration mode, wherein an ITV is controlled to the limited ITV position after the transition is detected.

12. The method of claim 11, further comprising controlling the ITV to the desired ITV position after the limited ITV position equals the desired ITV position.

13. The method of claim 11, further comprising generating the limited ITV position based on a signal from at least one of an engine speed (RPM) sensor and a manifold air pressure (MAP) sensor.

14. The method of claim 11, further comprising generating the limited ITV position that is between the desired ITV position in regeneration mode and the ITV braking position.

15. The method of claim 11, further comprising generating a limited ITV rate, wherein the ITV is controlled at the limited ITV rate after the transition is detected.

16. The method of claim 11, further comprising selecting the limited ITV position after the transition is detected.

17. The method of claim 11, further comprising setting the desired airflow to the regeneration mode airflow in the regeneration mode.

18. The method of claim 11, further comprising generating the exhaust braking request.

19. The method of claim 11, further comprising controlling a variable nozzle turbocharger (VNT) to a VNT braking position in the exhaust braking mode.

20. The method of claim 11, further comprising controlling an EGR valve to a closed position in the exhaust braking mode.

* * * * *